US006884849B2

(12) United States Patent
Chen et al.

(10) Patent No.: US 6,884,849 B2
(45) Date of Patent: Apr. 26, 2005

(54) POLY ALCOHOL-BASED BINDER COMPOSITION

(75) Inventors: Liang Chen, New Albany, OH (US); William E. Downey, Granville, OH (US); Kathleen M. Bullock, Zanesville, OH (US); Michael T. Pellegrin, Newark, OH (US); Yadi Delaviz, Granville, OH (US); Kevin Guigley, Granville, OH (US); Harry B. Cline, Heath, OH (US)

(73) Assignee: Owens-Corning Fiberglas Technology, Inc., Summit, IL (US)

( * ) Notice: Subject to any disclaimer, the term of this patent is extended or adjusted under 35 U.S.C. 154(b) by 57 days.

(21) Appl. No.: 10/325,039

(22) Filed: Feb. 21, 2003

(65) Prior Publication Data

US 2004/0167260 A1 Aug. 26, 2004

(51) Int. Cl.$^7$ ............................................. C08G 63/02
(52) U.S. Cl. .................. 525/272; 427/385.5; 428/447; 428/500; 524/445; 524/555; 525/271; 525/272
(58) Field of Search ................ 427/385.5; 428/447, 428/500; 524/445, 555; 525/271, 272

(56) References Cited

U.S. PATENT DOCUMENTS

| | | | |
|---|---|---|---|
| 3,914,192 A | 10/1975 | Flautt et al. | |
| 3,956,241 A | 5/1976 | Steele et al. | |
| 4,156,073 A | 5/1979 | Login | |
| 4,177,553 A | 12/1979 | Klein | |
| 4,198,491 A | 4/1980 | Blount | |
| 4,238,375 A | 12/1980 | Blount | |
| 4,540,743 A | 9/1985 | Schulz et al. | |
| 4,681,718 A | 7/1987 | Oldham | |
| 4,692,291 A | 9/1987 | Angell, Jr. | |
| 4,778,847 A | 10/1988 | Schornick et al. | |
| 4,795,533 A | 1/1989 | Young et al. | |
| 4,804,688 A | 2/1989 | Vassileff | |
| 4,824,807 A | 4/1989 | Blount | |
| 4,908,339 A | 3/1990 | Blount | |
| 4,945,074 A | 7/1990 | Blount | |
| 4,965,408 A | 10/1990 | Chapman et al. | |
| 5,164,258 A | 11/1992 | Shida et al. | |
| 5,314,943 A | * 5/1994 | Steinwand | 524/501 |
| 5,346,947 A | * 9/1994 | Guerro et al. | 524/591 |
| 5,354,803 A | 10/1994 | Dragner et al. | |
| 5,412,026 A | 5/1995 | Holy et al. | |
| 5,661,213 A | 8/1997 | Arkens et al. | |
| 5,763,524 A | 6/1998 | Arkens et al. | |
| 5,843,331 A | 12/1998 | Schober et al. | |
| 5,858,522 A | 1/1999 | Turk et al. | |
| 5,858,549 A | 1/1999 | Kielbania, Jr. et al. | |
| 5,977,232 A | 11/1999 | Arkens et al. | |
| 6,065,572 A | 5/2000 | Schober et al. | |
| 6,071,994 A | 6/2000 | Hummerich et al. | |
| 6,114,464 A | 9/2000 | Reck et al. | |
| 6,136,916 A | 10/2000 | Arkens et al. | |
| 6,146,556 A | 11/2000 | Katoot | |
| 6,221,973 B1 | 4/2001 | Arkens et al. | |
| 6,255,367 B1 | 7/2001 | Bitler et al. | |
| 6,262,159 B1 | 7/2001 | Dreher et al. | |
| 6,331,350 B1 | 12/2001 | Taylor et al. | |
| 2002/0091185 A1 | 7/2002 | Taylor et al. | |

FOREIGN PATENT DOCUMENTS

| | | |
|---|---|---|
| JP | 360226508 A | 11/1985 |
| WO | WO 96-15075 | 5/1996 |
| WO | WO 99/61384 | 12/1999 |

\* cited by examiner

*Primary Examiner*—Terressa Boykin
(74) *Attorney, Agent, or Firm*—Inger H. Eckert; Maria C. Gasaway

(57) ABSTRACT

The present invention provides a binder composition comprising a low molecular weight polycarboxylic acid, such as maleic anhydride, and a low molecular weight poly alcohol, such as polyvinyl alcohol, that exhibits improved cure performance with reduced emissions without sacrificing the performance of the final product or complication the manufacturing process. The binder composition may also incorporate a cure catalyst or accelerant such as sodium hypophosphite.

10 Claims, 2 Drawing Sheets

POLY ALCOHOL-BASED BINDER COMPOSITION

BACKGROUND OF THE INVENTION

1. Field of the Invention

The invention relates to the field of binder compositions utilized in the manufacture of fiber products, typically from glass fibers. Specifically, the invention relates to a poly alcohol-based aqueous binder composition and fiber products incorporating such a binder composition.

2. Background Information

Manufacture of glass fiber thermal insulation typically utilizes a continuous process in which raw batch materials are fed into a melting furnace to produce molten glass. The molten glass is then ejected from the furnace through a number of trays or bushings having small openings to form glass filaments. The initial glass filaments are then typically pulled and attenuated to produce the final fiber dimensions and cooled to form the glass fibers. The cooled fibers are then collected on a conveyor belt to form a mat.

The fibers are typically bonded together to form an integral batt or layer structure by applying a binder composition to the fibers as they are being collected on the conveyor belt. The collection of binder-coated fibers is then cured, typically in a curing oven, to evaporate remaining solvent and set the binder composition. The fibers in the resulting fiber product thus remain partially coated with a thin layer of the binder material and may exhibit greater accumulation or agglomeration at junctions formed where adjacent fibers are in contact or the spacing between them is very small. As a result of the improved strength and resiliency, the resulting fiber products exhibit higher recovery and stiffness than fiber products that do not incorporate a binder.

Fiberglass insulation products prepared in this manner can be provided in various forms including batt, board (a heated and compressed batt) and molding media (an alternative form of heated and compressed batt) for use in different applications. Most fiberglass batt insulation will have a density of less than 1 lb/ft$^3$ (16 kg/m$^3$) with about 4–5 wt % being binder. Fiberglass board typically has a density of between 1 and 10 lbs/ft$^3$ (16 and 160 kg/m$^3$) with about 7–12 wt % binder while fiberglass molding media will more typically have a density between 10 and 20 lbs/ft$^3$ (160 and 320 kg/m$^3$) with at least about 12 wt % binder. The glass fibers incorporated in these products typically have diameters from about 2 to about 9 microns and may range in length from about 0.25 inch (0.64 cm) to the extremely long fibers used in forming "continuous" filament products.

As the batt of binder-coated fibers emerges from the forming chamber, it will tend to expand as a result of the resiliency of the glass fibers. The expanded batt is then typically conveyed to and through a curing oven in which heated air is passed through the insulation product to cure the binder. In addition to curing the binder, within the curing oven the insulation product may be compressed with flights or rollers to produce the desired dimensions and surface finish on the resulting blanket, batt or board product. In the case of molding media, after partially curing the binder, the fiber product is fed into a molding press that will be used to produce the final product shape and to complete the curing process. Typically, for fiber products incorporating phenolic binders the curing ovens were operated at a temperature from about 200° C. to about 325° C. and preferably from about 250° C. to about 300° C. with curing processes taking between about 0.5 minute and 3 minutes.

Generally, the goal is to identify a binder system that is relatively inexpensive, is water soluble (or at least water dispersible), and can be easily applied and readily cured. The binder composition should also be sufficiently stable to permit mixing and application at temperatures ordinarily encountered in fiber product manufacturing plants. Further, the cured binder product should result in a strong bond with sufficient elasticity and thickness recovery to permit reasonable deformation and recovery of the resulting fiber product. Thickness recovery is especially important in insulation applications for both conserving storage space and providing the maximum insulating value after installation.

Phenol-formaldehyde binders, which are characterized by relatively low viscosity when uncured and the formation of a rigid thermoset polymeric matrix with the fibers when cured. A low uncured viscosity simplifies binder application and allows the binder-coated batt to expand more easily when the forming chamber compression is removed. Similarly, the rigid matrix formed by curing the binder allows a finished fiber product to be compressed for packaging and shipping and then recover to substantially its original dimension when unpacked for installation.

Phenol/formaldehyde binders utilized in the some prior art applications have been highly alkaline resole (also referred to as resol or A-stage) type that are relatively inexpensive and are water soluble. These binders are typically applied to the fibers as an aqueous solution shortly after the fibers are formed and then cured at elevated temperatures. The curing conditions are selected to evaporate any remaining solvent and cure the binder to a thermoset state. The fibers in the resulting product tend to be partially coated with a thin layer of the thermoset resin with accumulations of the binder composition being found at the junctions formed at points where adjacent fibers cross.

Various techniques have been used to reduce formaldehyde emission from phenol/formaldehyde resins including various formaldehyde scavengers added to the resin during or after its preparation. Urea is a commonly used formaldehyde scavenger that is effective both during and subsequent to the manufacture of the fiber product. Urea is typically added directly to the phenol/formaldehyde resin, to produce a urea-extended phenol/formaldehyde resole resin (also referred to as "premix" or "pre-react"). Further, urea, being less expensive than the alkaline phenol/formaldehyde resoles commonly used as binders, can provide substantial cost savings for fiber product manufacturers.

Low molecular weight, low viscosity binders which allow maximum vertical expansion of the batt as it exits the forming stage generally form a non-rigid plastic matrix when cured and reduce the vertical height recovery properties of the final product. Conversely, higher viscosity binders tend to cure to form a rigid matrix that interferes with the vertical expansion of the coated, but uncured, fiber batt.

These problems were addressed with a variety of non-phenol/formaldehyde binders exhibiting low uncured viscosity and structural rigidity when cured. One such binder composition was disclosed in U.S. Pat. No. 5,318,990, which is herein incorporated, in its entirety, by reference, and utilized a polycarboxy polymer, a monomeric trihydric alcohol and a catalyst comprising an alkali metal salt of a phosphorous containing organic acid. Other binder compositions have also been developed to provide reduced emissions during the coating and curing processes utilizing compounds such as polyacrylic acid as disclosed in U.S. Pat. Nos. 5,670,585 and 5,538,761, which are herein incorporated, in their entirety, by reference.

Another binder composition is disclosed in U.S. Pat. No. 5,661,213, which teaches an aqueous composition comprising a polyacid, a polyol and a phosphorous-containing accelerator, wherein the ratio of the number of equivalents of the polyacid to the number of equivalents of the polyol is from about 100:1 to about 1:3.

As disclosed in U.S. Pat. No. 6,399,694, another alternative to the phenol/formaldehyde binders utilizes polyacrylic glycol (PAG) as a binder. Although more expensive, PAG binders are relatively odorless, more uniformly coat each fiber and have a generally white color. These characteristics, coupled with the recognition that coloring agents adhere readily, make PAG binders preferable for applications in which the fiber product will be visible after installation. Indeed, fiber board products utilizing PAG binders can be provided with decorative surfaces suitable for display.

The use of polyacrylic acid based binders, however, has resulted in corrosion problems in manufacturing equipment. Thus, there continues to exist a need for a method of inhibiting and reducing the corrosion associated with these prior art binders.

SUMMARY OF THE INVENTION

An object of the present invention to provide a binder composition that exhibits improved cure performance with reduced emissions without sacrificing the performance of the final product or complication the manufacturing process.

This and other objects of the present invention are accomplished by providing a binder composition comprising a low molecular weight multifunctional acid, such as maleic anhydride, fumaric acid, malic acid, or citric acid, with a low molecular weight poly alcohol such as polyvinyl alcohol (PVA or PVOH) or poly(ethylene-co-vinyl alcohol), and an optional catalyst, such as sodium hypophosphite.

DETAILED DESCRIPTION OF THE PREFERRED EMBODIMENT(S)

Figure 1:
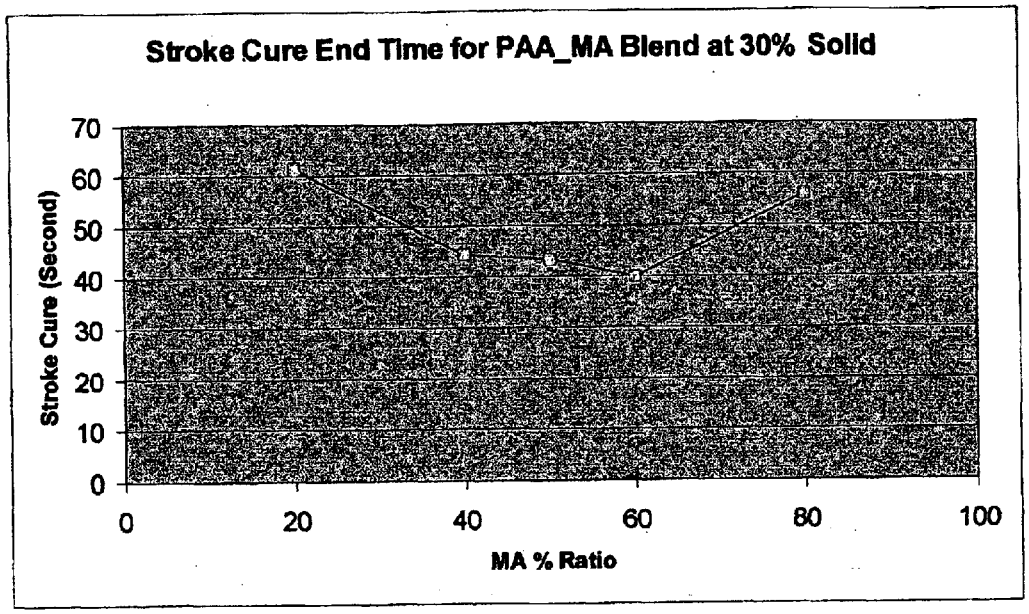
FIG. 1 is a graph reflecting the average stroke end cure time plotted against the organic (maleic) acid ratio of the binder premix solution samples.

The invention will now be described in more detail by way of example with reference to the embodiment(s) described herein. It should be kept in mind that the following described embodiment(s) is/are only presented by way of example and should not be construed as limiting the inventive concept to any particular physical configuration.

Although a number of binder systems and compositions are generally available, including phenol/formaldehyde binders, extended phenol/formaldehyde binders, PAG binders and polyacrylic acid/triethanolamine (PAT) binders, none of these binder systems has successfully utilized a low molecular weight multifunctional organic acid and a low molecular weight poly alcohol to form a polyester thermoset resin system. The present invention, however, provides a binder system that produces a thermoset polyester by reacting a low molecular weight (e.g., less than 1000) multifunctional acid, such as maleic anhydride, fumaric acid, or malic acid, with a low molecular weight (e.g., between about 200 and about 13,000) polymer or oligomer of one or more alcohols such as polyvinyl alcohol or poly(ethylene-co-vinyl alcohol). The present invention, therefore, provides an advantageous alternative to the existing binder systems.

In accord with the present invention, a low molecular weight polyol, preferably a polyvinyl alcohol, such as Air Product's AIRVOL® 502 or Celanese Chemicals' CELVOL® 502, is dissolved in water to make a 10–30 wt % polyol solution. The polyol solution is then mixed with a 10–30 wt % aqueous solution of a low molecular weight, multifunctional organic acid. By varying the specific polyol and organic acid compositions, the initial concentrations, and the mixing ratio of the two solutions, a wide range of thermoset binder solutions can be prepared. In addition to the polyol and the organic acid, the binder solution preferably comprises at least one cure catalyst or accelerator, such as sodium hypophosphite, to enhance the cure rate of the binder composition. It is preferred that the ratio of the functional groups of the organic acid and poly alcohol components be within a range of about 1:10 to about 5:1. It is also preferred that the pH of the binder composition be fairly acidic with a pH value of between about 1.5 and about 4.5 to avoid forming the carboxylic salt from the carboxylic acid and ensure that the carboxylic acid will form the desired ester with the poly alcohol during the crosslinking reaction.

A number of examples of the present invention were prepared as follows:

A 30 wt % polyol solution was prepared by dissolving 60 g of CELVOL® 502 polyvinyl alcohol powder in 140 g of water. The mixture was heated and continually agitated until the polyvinyl alcohol was completely dissolved.

A 30 wt % acid solution was prepared by dissolving 60 g of maleic anhydride briquette (Huntsman Petrochemical Corp.) in 140 g of water. The mixture was heated and maintained at a temperature of approximately 50° C. until the maleic anhydride was completely dissolved.

A series of five 30 wt % binder premix solutions were then prepared by combining quantities of the 30 wt % polyol solution and the 30 wt % acid solution as indicated below in Table 1. The curing performance of each of the binder premix solutions was then evaluated, with the results also provided in Table 1. In certain instances, specifically those in which the polyol/acid ratio was 1:4, the binder compositions exhibited a very low initial viscosity and did not form fiber during the heating process. Under continued heating the binder composition eventually underwent the crosslinking reaction, reaching a substantially complete thermoset condition in a very short period of time. As a result, certain of the compositions include only an "End" time for the Stroke Cure trials reflected below.

TABLE 1

| | Solution Weight | | Stroke Cure Trial 1 (seconds) | | Stroke Cure Trial 2 (seconds) | | Stroke Cure Trial 3 (seconds) | | Stroke Cure Average | |
|---|---|---|---|---|---|---|---|---|---|---|
| | Acid | Polyol | Begin | End | Begin | End | Begin | End | Begin | End |
| 1 | 4 | 16 | 35 | 60 | 40 | 61 | 40 | 63 | 38 | 61 |
| 2 | 8 | 12 | 13 | 44 | 17 | 41 | 14 | 48 | 15 | 44 |
| 3 | 10 | 10 | 19 | 44 | 14 | 44 | 13 | 42 | 15 | 43 |
| 4 | 12 | 8 | 16 | 40 | 18 | 41 | 16 | 39 | 17 | 40 |
| 5 | 16 | 4 | N/A | 56 | N/A | 54 | N/A | 58 | N/A | 56 |

The average Stroke Cure end times resulting from the trials detailed in Table 1 are plotted in FIG. 1 against the ratio of organic acid (20–80%) present in the sample. As reflected in FIG. 1, the best cure performance is achieved with binder premix solutions in which the organic acid and polyol ratios are generally between 3:2 and 2:3.

Figure 2:
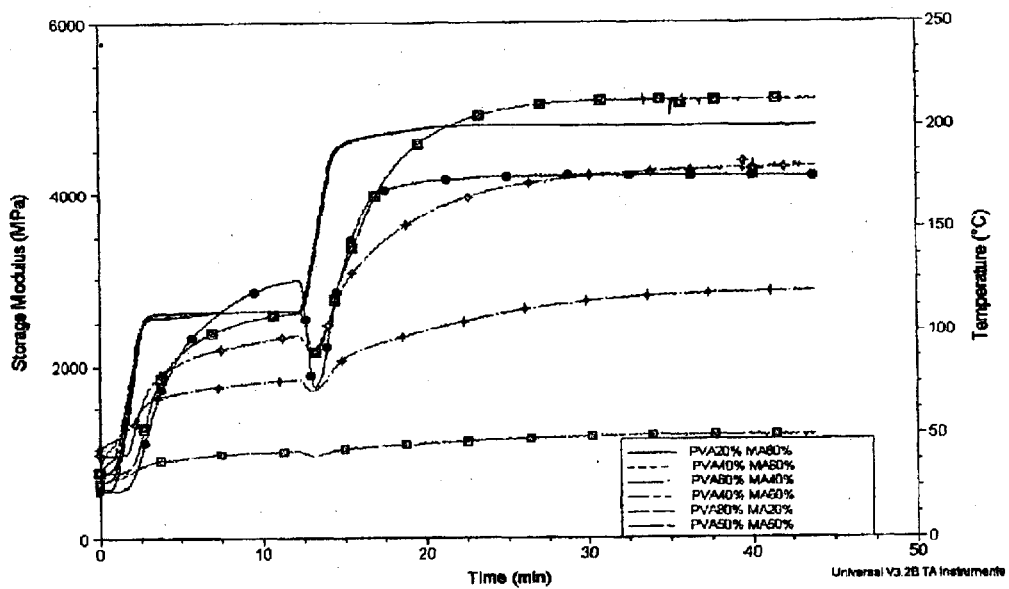
FIG. 2 is a graph reflecting a dynamic mechanical analyzer (DMA) trace of the storage modulus (MPa) against time for each of the binder premix solution samples.

Each of the binder premix solutions reflected in Table 1 was also subjected to a Dynamic Mechanical Analysis (DMA) to evaluate the storage modulus of the binder during the cure cycle. The results of this analysis are reflected in FIG. 2 and indicate that the cross-linking strength was increased for those binder premix solutions as the ratio of the organic acid was increased.

Figure 3:
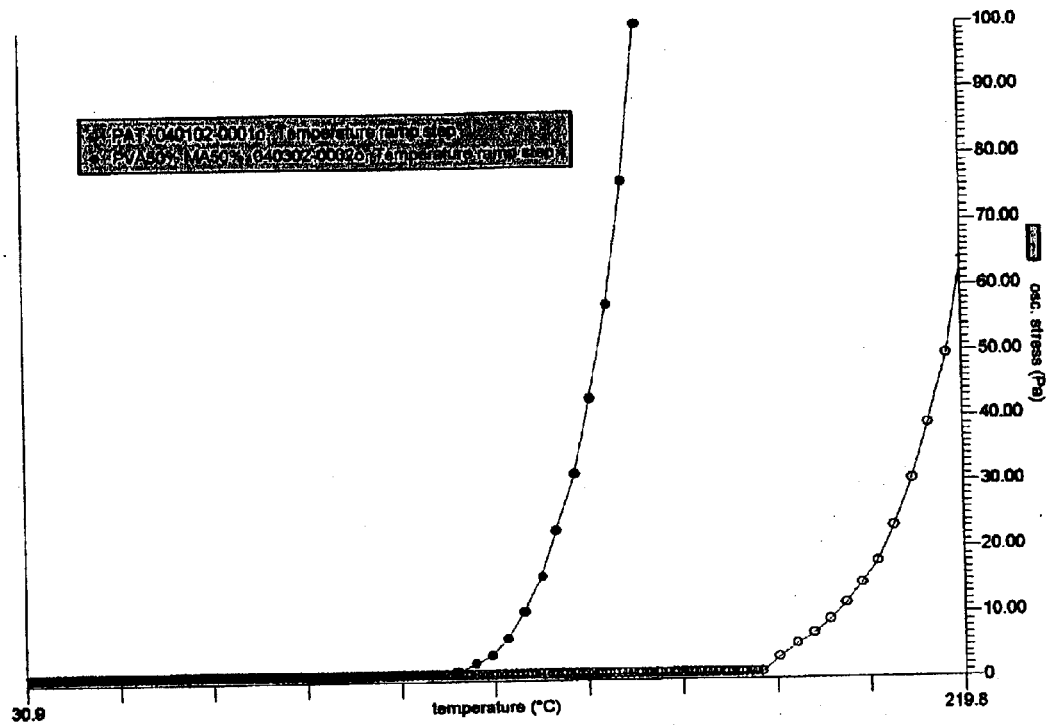
FIG. 3 is a graph reflecting the cure performance of a 1:1 binder premix solution of maleic acid and PVA according to the present invention and a prior art binder composition comprising a hypophosphite terminated polyacrylic acid/triethanolamine binder (PAT Plus).

A rheometer was then used to compare a 1:1 mixture of a PVA solution (CELVOL® 502) and an organic acid solution (maleic anhydride) according to the present invention to a prior art PAT Plus binder composition (hypophosphite terminated polyacrylic acid triethanolamine binder). As reflected in FIG. 3, the binder according to the present invention exhibits both a lower cure start temperature and higher cure rate.

Figure 4:
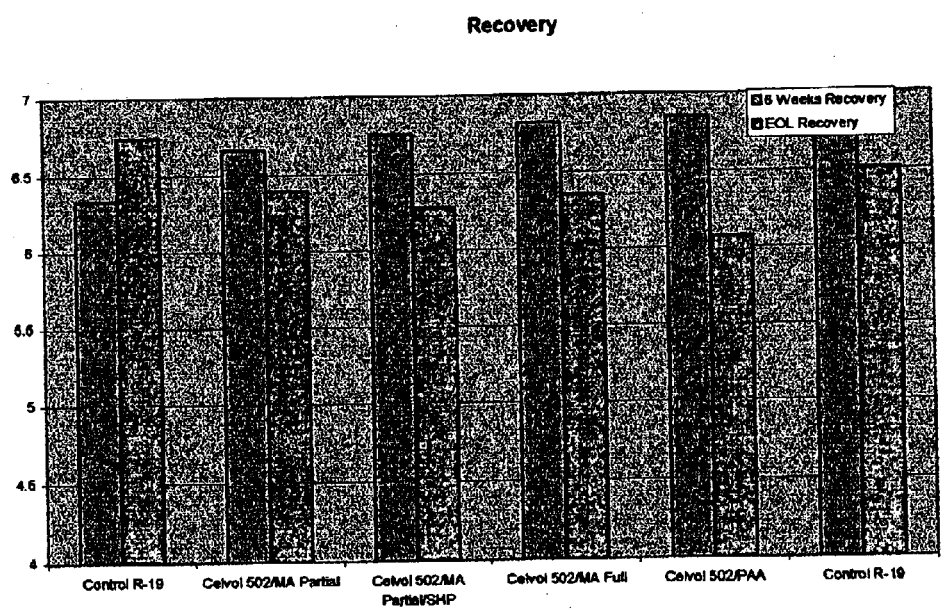
FIG. 4 is a bar graph reflecting data from Table 2 and documenting the recovery of batts coated with a standard phenolic binder and binder compositions according to the present invention taken at the end-of-line (EOL) and six weeks post-production.

A plant production trial was conducted using both a partially hydrolyzed component and a fully hydrolyzed component of a low molecular weight version of CELVOL® 502 (number average Mn<7,000) and maleic anhydride, with and without a sodium hypophosphite accelerator. The recovery of the batts produced during this were tested at completion (end-of-line or EOL) and after six weeks and compared with control samples prepared using a traditional phenol/formaldehyde binder systems. The results of these tests are provided below in Table 2. These results are also illustrated in FIG. 4.

TABLE 2

| Binder System | EOL Recovery | Six Week Recovery |
|---|---|---|
| STD | 6.74 | 6.33 |
| PVA$_{ph}$/MA | 6.39 | 6.66 |
| PVA$_{ph}$/MA (with SHP) | 6.27 | 6.75 |
| PVA$_{fh}$/MA | 6.35 | 6.82 |
| PVA$_{ph}$/PAA (75/25 Mix) | 6.07 | 6.85 |
| STD | 6.51 | 6.78 |

PVA$_{ph}$—partially hydrolyzed polyvinyl alcohol (Mn < 7,000)
PVA$_{fh}$—fully hydrolyzed polyvinyl alcohol (Mn < 7,000)
SHP—sodium hypophosphite
PAA—polyacrylic acid (Mn ≈ 2000–5000)
STD—phenol-formaldehyde binder It will be understood that the above described preferred embodiment(s) of the present invention is susceptible to various modifications, changes, and adaptations, and the same are intended to be comprehended within the meaning and range of equivalents of the appended claims. In particular, it is anticipated that other low molecular weight polycarboxylic acids including oxalic, tartaric, formic, lactic, acetic, diglycollic and succinic acids, low molecular weight oligomers thereof as well as mixtures thereof, would be suitable for use in the present invention.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

We claim:

1. A binder composition comprising:
    a low molecular weight polyalcohol, the polyalcohol comprising an oligomer or polymer of one or more alcohols and having a number average molecular weight of at least 200;
    a low molecular weight polycarboxylic acid; and
    water.

2. A binder composition according to claim 1, further comprising:
    a cure accelerant.

3. A binder composition according to claim 1 wherein:
    the low molecular weight polyalcohol is further characterized by a number average molecular weight of less than about 13,000 and is selected from a group consisting of polyvinyl alcohol, polyethylene glycol, polyethylene-co-vinyl alcohol and mixtures thereof; and
    the low molecular weight polycarboxylic acid is selected from a group consisting of citric acid, maleic anhydride, maleic acid, fumaric acid, malic acid, oligomers thereof having an average molecular weight of less than about 1000, and mixtures thereof.

4. A binder composition according to claim 3, wherein:
    the polyalcohol and the polycarboxylic acid are present in the binder composition in a weight ratio between 1:4 and 4:1.

5. A binder composition according to claim 3, wherein:
    the polyalcohol and the polycarboxylic acid are present in the binder composition in a weight ratio between 2:3 and 3:2.

6. A binder composition according to claim 3, wherein:
    the polyalcohol and the polycarboxylic acid are present in the binder composition in a weight ratio of approximately 1:1.

7. A binder composition according to claim 2, wherein:
the cure accelerant comprises sodium hypophosphite.

8. A binder composition consisting essentially of:
a low molecular weight polyalcohol, the polyalcohol comprising an oligomer or polymer of one or more alcohols and having a number average molecular weight of at least 200;
a low molecular weight polycarboxylic acid; and
water.

9. A binder composition according to claim 8, further consisting essentially of:
a cure accelerant.

10. A binder composition according to claim 8 wherein:
the low molecular weight polyalcohol has a number average molecular weight of less than about 13,000 and is selected from a group consisting of polyvinyl alcohol, polyethylene glycol, polyethylene-co-vinyl alcohol and mixtures thereof; and
the low molecular weight polycarboxylic acid is selected from a group consisting of citric acid, maleic anhydride, maleic acid, fumaric acid, malic acid, oligomers thereof having an average molecular weight of less than about 1000, and mixtures thereof.

* * * * *